(12) United States Patent
Ogawa et al.

(10) Patent No.: US 8,286,903 B2
(45) Date of Patent: Oct. 16, 2012

(54) SEAT BELT RETRACTOR

(75) Inventors: Kiyoshi Ogawa, Yokohama (JP); Masuo Matsuki, Yokohama (JP)

(73) Assignee: Autoliv Development AB, Vergarda (SE)

( * ) Notice: Subject to any disclaimer, the term of this patent is extended or adjusted under 35 U.S.C. 154(b) by 140 days.

(21) Appl. No.: 12/945,478

(22) Filed: Nov. 12, 2010

(65) Prior Publication Data
US 2011/0121120 A1 May 26, 2011

(30) Foreign Application Priority Data

Nov. 20, 2009 (JP) .................................. 2009-265714

(51) Int. Cl.
*B65H 75/48* (2006.01)
(52) U.S. Cl. ..................................... 242/379.1
(58) Field of Classification Search .................. 242/374, 242/379.1; 280/806; 297/478
See application file for complete search history.

(56) References Cited

U.S. PATENT DOCUMENTS

| | | | | |
|---|---|---|---|---|
| 5,938,135 A | * | 8/1999 | Sasaki et al. .................. | 242/374 |
| 5,967,441 A | * | 10/1999 | Kohlndorfer et al. ...... | 242/379.1 |
| 6,047,914 A | * | 4/2000 | Sasaki ......................... | 242/379.1 |
| 6,568,621 B2 | * | 5/2003 | Hiramatsu et al. .......... | 242/379.1 |
| 7,354,014 B2 | * | 4/2008 | Hiramatsu .................. | 242/379.1 |
| 7,410,114 B2 | * | 8/2008 | Webber et al. .............. | 242/379.1 |

FOREIGN PATENT DOCUMENTS

| | | |
|---|---|---|
| JP | 2000-016245 A | 1/2000 |
| JP | 2002-347573 A | 12/2002 |
| JP | 2002-356141 A | 12/2002 |
| JP | 2004-210005 A | 7/2004 |
| JP | 2009-012661 A | 1/2009 |
| JP | 2009-173103 A | 8/2009 |

* cited by examiner

*Primary Examiner* — Sang Kim
(74) *Attorney, Agent, or Firm* — Brinks Hofer Gilson & Lione (57) ABSTRACT

A retractor includes a slide nut that is caused to slide toward a tread head while rotating by a mesh between a first male screw groove and a female screw groove when the tread head is locked and a spindle rotates in a direction for unreeling a webbing, and a slider that is caused to slide toward the slide nut by a mesh between the female screw groove and a second male screw groove. A torsional rigidity of a second shaft part of a torsion bar is larger than that of a first shaft part, and a play is eliminated before a gap such that the slide nut and the slider are integrated.

6 Claims, 7 Drawing Sheets

SEAT BELT RETRACTOR

RELATED APPLICATION

The present application claims priority to Japanese Patent Application No. 2009-265714, filed Nov. 20, 2009, the entirety of which is hereby incorporated by reference.

BACKGROUND OF THE INVENTION

1. Field of the Invention

The present invention relates to a seat belt retractor for retracting a seat belt of a vehicle.

2. Description of the Related Art

When a vehicle receives an impact during a collision or the like, a retractor for retracting a webbing (a belt) of a seat belt apparatus is locked so that the webbing cannot be unreeled any further unless it is pulled with considerable force. Meanwhile, a pretensioner provided in the retractor is also activated to retract the webbing, thereby eliminating looseness in the webbing, before an upper body of an occupant tilts forward. Thus, the webbing contacts a body of the occupant closely, and as a result, a restraining performance of the seat belt is improved (Japanese Patent Application Publication No. 2009-173103, for example).

When the upper body of the occupant is tilted forward by the impact of the collision so that a bodyweight of the occupant acts on the webbing with a force that exceeds the aforementioned considerable force, a load limiter mechanism of the retractor is activated to unreel the webbing by a small amount. Thus, a load applied to the body of the occupant from the webbing is lightened, and as a result, the occupant is protected from injuries such as a broken rib. When the load limiter mechanism is activated, the upper body of the occupant tilts forward to a certain extent (see Japanese Patent Application Publication No. 2004-210005, for example).

The forward-tilting upper body of the occupant is also supported by an air bag activated when the collision occurs, and therefore the occupant is protected such that a head portion of the occupant does not collide with a frontward steering wheel or the like (see Japanese Patent Application Publication No. 2009-012661, for example).

A seat belt apparatus must satisfy predetermined legal requirements. According to recent regulations pertaining to collision safety, a certain degree of safety must be secured regardless of a physique of the occupant. According to U.S Federal Motor Vehicle Safety Standards (FMVSS) in particular, safety requirements during a crash test vary between a fifth percentile adult female (AF 5%) and a fiftieth percentile adult male (AM 50%). Safety requirements can be cleared by applying a small restraining force to the former, but cannot be cleared unless at least an equivalent restraining force is applied to the latter.

An adaptive load limiter (LLA) has been proposed to satisfy these requirements. An adaptive load limiter includes a mechanism for switching the load applied to the body of the occupant from the webbing on the basis of a build of the occupant, which is detected by an occupant detection sensor.

However, a vehicle may receive an impact from two consecutive collisions. For example, a first impact may be received when the vehicle drives over a curbstone separating a road from a sidewalk and a second impact may be received when the vehicle continues to travel until it collides with a guardrail. However, activation leeway may remain in the load limiter mechanism after being activated by the first impact. In this case, the load limiter mechanism is reactivated when the bodyweight of the occupant is exerted on the webbing by the second impact, and as a result, the body of the occupant may tilt further forward.

The pretensioner of the retractor and the air bag, on the other hand, are activated by the first impact and cannot be reactivated. Therefore, at the time of the second impact, the load limiter mechanism is activated in a state where the pretensioner and the air bag are not functional. When the upper body of the occupant is tilted forward by the load limiter mechanism in this state, the occupant may be exposed to danger.

Further, an adaptive load limiter that satisfies predetermined regulations requires the occupant detection sensor in order to detect the build of the occupant and the switching mechanism for switching the load, and therefore a cost increase occurs.

SUMMARY OF THE INVENTION

In consideration of these problems, an object of the present invention is to provide a seat belt retractor that can prevent an upper body of an occupant from tilting forward when a load limiter mechanism is activated by a second impact in a case where a vehicle receives two consecutive impacts, thereby improving the safety of a seat belt and satisfying predetermined regulations without an accompanying cost increase.

To achieve this object, a representative constitution of a seat belt retractor according to the present invention includes: a spindle for retracting a webbing; a torsion bar including a first shaft part and a second shaft part having a different torsional rigidity and an intermediate portion connecting the first and second shaft parts, the torsion bar being inserted into an interior of the spindle and joined to the spindle by an end portion of the first shaft part; a tread head joined to an end portion of the second shaft part of the torsion bar; a male screw portion that is joined to the tread head that has a cylindrical shape projecting into the interior of the spindle, and includes a first male screw groove on an outer surface thereof; a slide nut that is disposed in the interior of the spindle at a gap from the tread head to be capable of sliding but incapable of rotating relative to the spindle, a female screw groove that meshes with the first male screw groove of the male screw portion being formed on an inner surface thereof, and that is caused to slide toward the tread head while rotating by a mesh between the first male screw groove and the female screw groove when the tread head is stopped from rotating by a predetermined lock mechanism and the spindle rotates in a direction for unreeling the webbing; and a slider that is capable of sliding but incapable of rotating relative to the intermediate portion, a second male screw groove that meshes with the female screw groove of the slide nut being formed on an outer surface thereof while leaving play therebetween, and that is caused to slide toward the slide nut by a mesh between the female screw groove and the second male screw groove when the slide nut slides toward the tread head while rotating, wherein a torsional rigidity of the second shaft part is greater than a torsional rigidity of the first shaft part, and the play is eliminated before the gap such that the slide nut and the slider are integrated.

According to this constitution, a load limiter operates as follows. Hereafter, an initial collision and a following collision will be referred to respectively as a first collision and a second collision. When the first collision occurs, the tread head is fixed to a frame (a vehicle body) by the lock mechanism and thereby prevented from rotating. Before the upper body of the occupant tilts forward, a pretensioner is activated to retract the webbing and eliminate looseness therein. When the upper body of the occupant tilts forward such that a load is exerted on the webbing, the spindle attempts to rotate in the direction for unreeling the webbing. Torque is transmitted to the torsion bar via the end portion of the first shaft part of the torsion bar, which is joined to the spindle. At this time, the torsion bar is joined to the tread head by the end portion of the second shaft part, and therefore the torque acts on the entire torsion bar. When the torque exceeds the torsional rigidity of the first shaft part, the first shaft part twists. As a result, a load limitation operation of the first collision is performed.

When the first shaft part twists, the spindle rotates in the direction for unreeling the webbing. When the spindle rotates, the slide nut slides toward the tread head while rotating. Meanwhile, since the intermediate portion is joined to the second shaft part, which does not twist due to its large torsional rigidity, the intermediate portion does not rotate relative to the tread head. Hence, the slider remains stationary in absolute terms but rotates relative to the rotating slide nut. As a result, the slider slides toward the slide nut.

The slider chases the slide nut sliding in the direction of the tread head, and since the play between the slide nut and the slider is eliminated before the gap between the tread head and the slide nut, the slide nut and the slider are integrated. As a result, the torque input into the slide nut from the spindle is transmitted to the slider and input therefrom into the intermediate portion. In other words, the torque of the spindle is input only into the second shaft part of the torsion bar. The reason for this is that a phase shift does not occur between the first shaft part that receives the torque from the spindle initially and the intermediate portion that receives the torque from the spindle newly, and therefore the torque does not act on the first shaft part.

According to the operation described above, the load limiter mechanism prepares a small torsional rigidity F1 for the first collision and a large torsional rigidity F2 for the second collision. In other words, the load limiter mechanism withstands a larger webbing unreeling force during the second collision than during the first collision. During the second collision, the load limiter mechanism is not activated, and the webbing is therefore not unreeled, unless a considerably large force for unreeling the webbing is applied to the retractor.

In other words, according to the present invention, occupant restraint is prioritized over activation of the load limiter mechanism during the second collision. The reason for this is that during the second collision, the pretensioner and an air bag activated during the first collision cannot be used. Hence, the present invention prioritizes the avoidance of serious injury to the occupant that may occur during the second collision due to non-activation of the air bag and so on over the avoidance of lighter injuries to the occupant caused by excessive restraining force from the webbing.

Further, according to the present invention, the energy of an occupant having the build of a fifth percentile adult female can be absorbed in a low load region by the small torsional rigidity F1 prepared for the first half of the operation of the load limiter mechanism, while the energy of an occupant having the build of a fiftieth percentile adult male can be absorbed in a high load region by the large torsional rigidity F2 prepared for the latter half.

Since the large torsional rigidity F2 is provided for the latter half, a movement amount of an occupant having the build of a fiftieth percentile adult male increases. However, a level of safety required to satisfy predetermined regulations can be secured in cooperation with the air bag.

When a large torsional rigidity is provided for the first half and a small torsional rigidity is provided for the latter half, the movement amount of an occupant having the build of a fiftieth percentile adult male can be reduced. However, the upper body of an occupant having the build of a fifth percentile adult female is substantially incapable of moving, and therefore the load limiter may not be activated, with the result that the occupant is restrained by excessive restraining force. It is therefore preferable to provide the small torsional rigidity F1 in the first half and the large torsional rigidity F2 in the latter half, as in the present invention, so that occupant safety can be secured regardless of the build of the occupant.

Furthermore, according to the present invention, load switching is performed automatically, and therefore, in contrast to a conventional adaptive load limiter, there is no need to detect the build of the occupant and switch the load in accordance therewith. Since an occupant detection sensor and a load switching mechanism are not required, a cost increase is avoided.

When the play is eliminated, the integrated slide nut and slider preferably continue to slide until the gap is eliminated, whereby the integrated slide nut and slider can be integrated with the tread head.

If a torque that is intense enough to exceed the torsional rigidity of the second shaft part is applied during the second collision such that the webbing is unreeled, the integrated slide nut and slider slide toward the tread head while rotating such that the gap is eliminated. Accordingly, the slide nut and slider are further integrated with the tread head. These integrated components function as a stopper for preventing the spindle from rotating any further in the direction for unreeling the webbing, and therefore unreeling of the webbing is stopped promptly.

Since the load limiter mechanism is stopped forcibly by the stopper, the occupant may receive a large impact from the webbing during the second collision. However, if the load limiter mechanism is activated in a state where the air bag and so on are not functional, a head portion of the occupant may collide with a steering wheel or the like such that the occupant sustains a more serious injury. With the present invention, this situation is avoided.

A length of the gap is preferably greater than a length of the play. The reason for this is that when the pitch of the female screw groove of the slide nut is constant, the gap and the play are eliminated at an equal speed, and therefore the shorter play is eliminated first.

The female screw groove preferably has a larger pitch in a part that meshes with the second male screw groove of the slider than in a part that meshes with the first male screw groove of the male screw portion. The reason for this is that when the gap and the play have equal lengths, the play formed between the female screw and the second male screw groove of the slider, which are meshed at a larger pitch, is eliminated first.

According to the present invention, a seat belt retractor that can prevent an upper body of an occupant from tilting forward when a load limiter mechanism is activated by a second impact in a case where a vehicle receives two consecutive impacts can be provided, and as a result, the safety of a seat belt can be improved and predetermined regulations can be satisfied without an accompanying cost increase.

DESCRIPTION OF THE PREFERRED EMBODIMENTS

A preferred embodiment of the present invention will be described in detail below with reference to the attached drawings. Dimensions, materials, specific numerical values, and so on indicated in this embodiment are merely examples for facilitating comprehension of the invention, and unless indicated otherwise, the present invention is not limited thereto. Note that in the specification and drawings, elements having substantially identical functions and constitutions have been allocated identical reference symbols and duplicate description thereof has been omitted. Further, elements that are not directly related to the present invention have been omitted from the drawings.

(Seat Belt Device)

Figure 1:
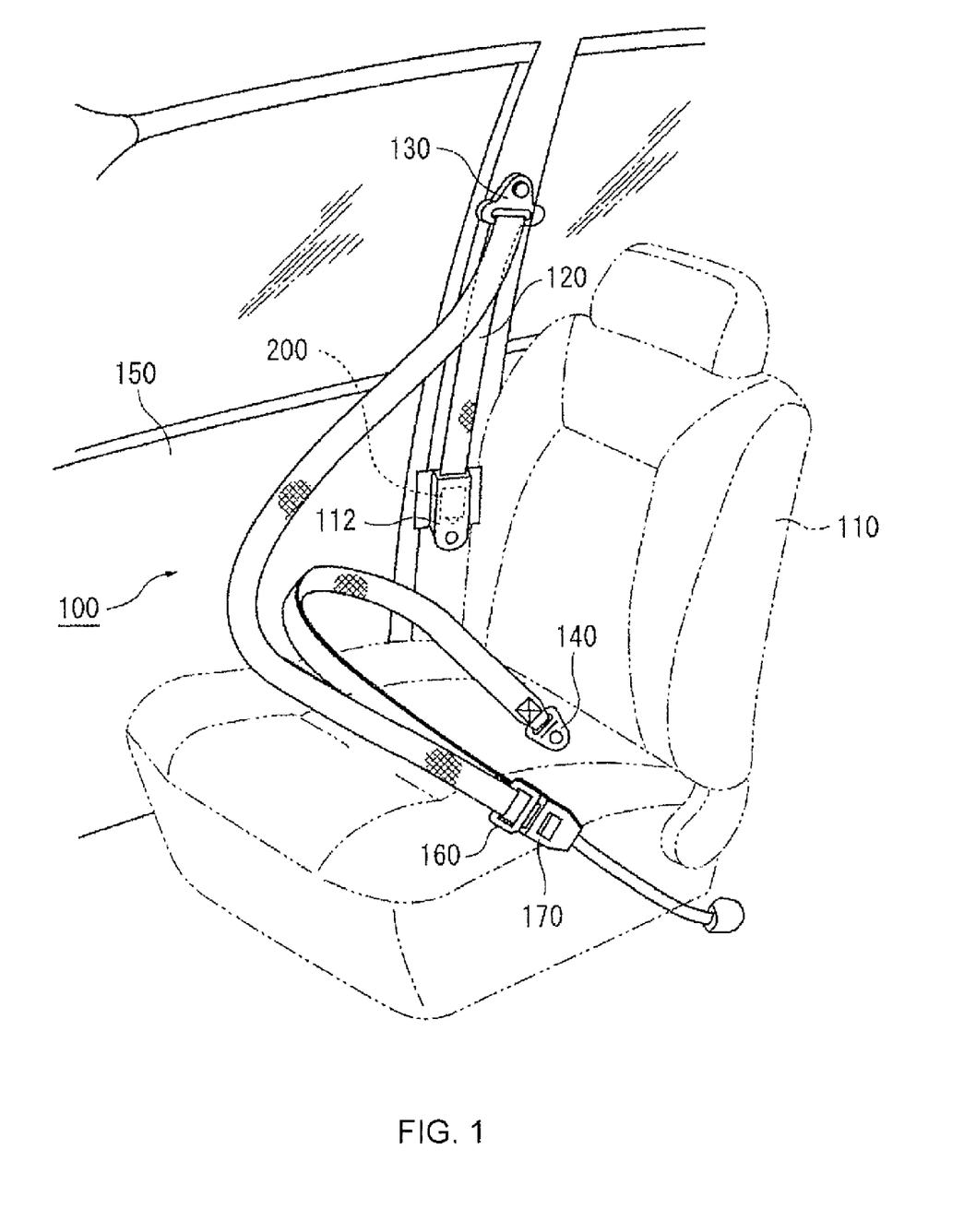
FIG. 1 is a view showing an example of the constitution of a seat belt apparatus to which a seat belt retractor according to an embodiment of the present invention is applied.

FIG. 1 is a view showing an example of the constitution of a seat belt apparatus to which a seat belt retractor according to this embodiment of the present invention is applied. A seat belt apparatus 100 includes a through anchor 130 that folds back a webbing 120 originating from a retractor housing portion 112 disposed close to and below a shoulder portion of a seat 100 of a vehicle so that the webbing 120 slides from a vehicle body side to a vehicle inner side. A seat belt retractor 200 according to this embodiment is housed in the retractor housing portion 112 and cannot therefore be seen in reality. In FIG. 1, however, the seat belt retractor 200 is indicated by a dotted line.

An anchor plate 140 is sewn onto an end portion of the webbing 120 folded back by the through anchor 130. In FIG. 1, the anchor plate 140 is not fixed, but in actuality, the anchor plate 140 is attached to a lower end portion of a vehicle body between a door 150 and the seat 110 by a bolt or the like. A tongue plate 160 into which the webbing 120 is inserted is provided in an intermediate position between the through anchor 130 and the anchor plate 140. When the tongue plate 160 is engaged with a buckle 170 attached to a vehicle center portion, the seat belt apparatus 100 enters a fastened state.

(Retractor)

Figure 2:
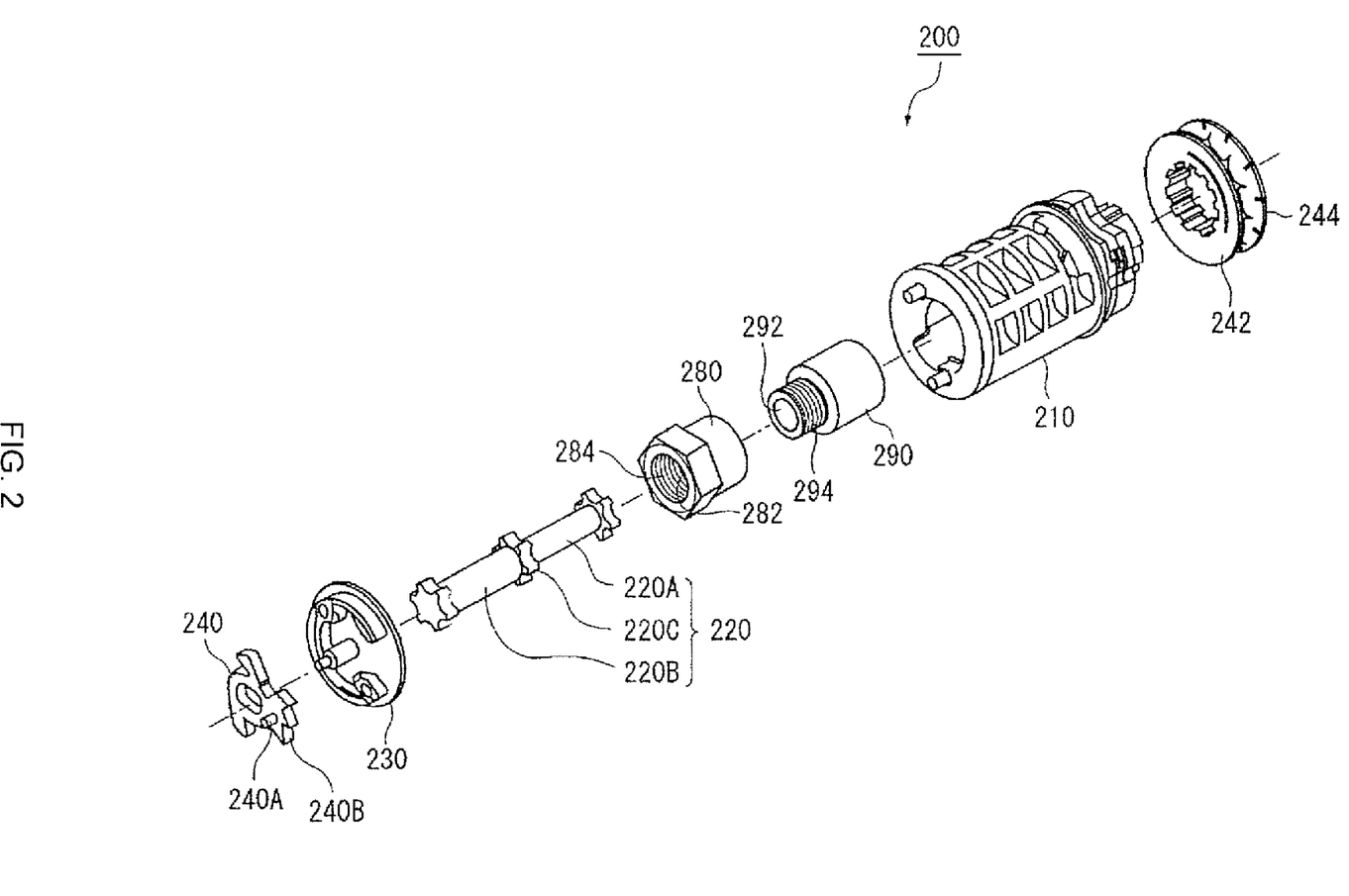
FIG. 2 is an assembly drawing of the seat belt retractor shown in FIG. 1.

FIG. 2 is an assembly drawing of the seat belt retractor 200 (to be referred to simply as the "retractor 200" hereafter) shown in FIG. 1. The retractor 200 includes a spindle 210 for retracting the webbing 120 by an outer peripheral surface thereof. An interior of the spindle 210 is hollow, and here, a torsion bar 220 used as a load limiter is inserted into the spindle 210. The torsion bar 220 includes a first shaft part 220A and a second shaft part 220B, which differ in torsional rigidity, and an intermediate portion 220C connecting the first and second shaft parts 220A, 220B. The second shaft part 220B of the torsion bar 220 has a larger diameter and greater torsional rigidity than the first shaft part 220A.

The retractor 200 includes a tread head 230 that is joined to an end portion of the second shaft part 220B of the torsion bar 220. When the torsion bar 220 rotates, the tread head 230 rotates upon reception of torque resulting from the rotation of the torsion bar 220. When a predetermined lock mechanism is activated, the tread head 230 stops rotating, and as a result, the end portion of the second shaft part 220B of the torsion bar 220 is fixed. The tread head 230 is not joined to the spindle 210.

Various well known constitutions may be employed as the lock mechanism of the retractor 200. In this embodiment, the lock mechanism is constituted by a lock dog 240. When an acceleration sensor, not shown in the drawings, detects horizontal direction acceleration larger than a predetermined value during a vehicle collision or the like, a pin 240A of the lock dog 240 is moved radially outward by a predetermined cam mechanism. As a result, tooth portions 240B of the lock dog 240 engage with a retractor frame 250 (FIG. 3) indirectly such that an unreeling operation performed on the webbing 120 by the spindle 210 is locked.

The retractor 200 includes a pretensioner which is activated by a pinion 242. A driving apparatus, not shown in the drawing, is provided in the vicinity of the pinion 242 such that when a crash occurs, gas is generated before an upper body of an occupant tilts forward. The gas causes a plurality of balls (not shown) to enter a groove 244, which formed in the pinion 242, continuously along a predetermined path, and the balls cause the pinion 242 to rotate. Torque generated by the rotation of the pinion 242 is transmitted to the spindle 210 via the torsion bar 220, and as a result, the spindle 210 retracts the webbing 120. Thus, the pretensioner is activated.

Figure 3A:
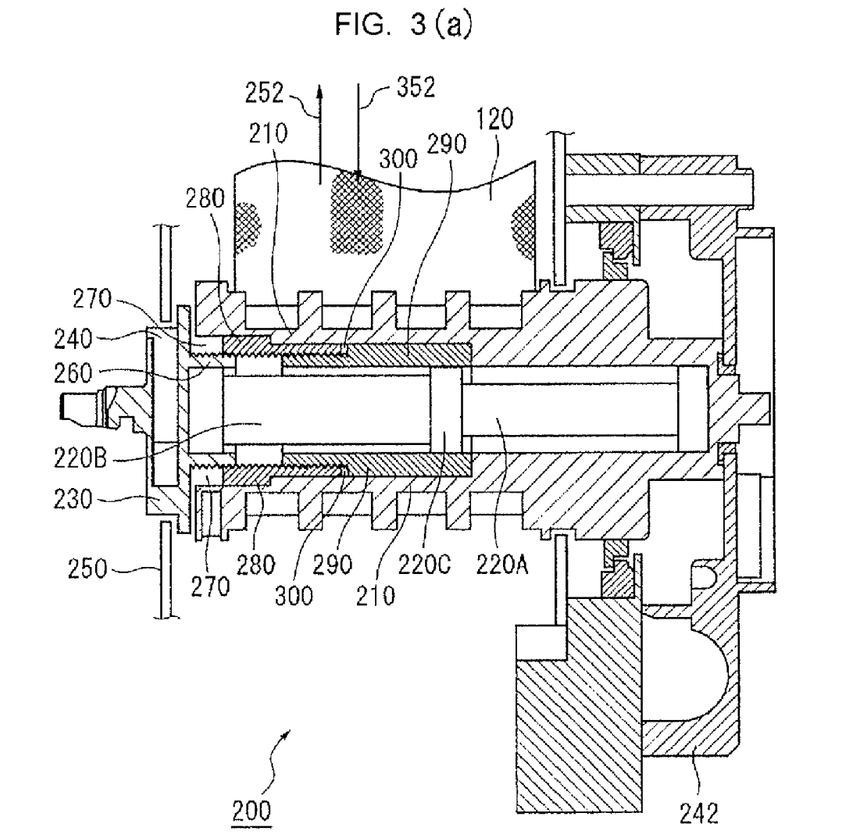
FIG. 3 is a sectional view showing an example of the constitution of the retractor shown in FIG. 2.

FIG. 3 is a sectional view showing an example of the constitution of the retractor 200 shown in FIG. 2. FIG. 3A shows the entire retractor 200. A right end of the torsion bar 220 in FIG. 3, or in other words an end portion of the first shaft part 220A, is joined to the spindle 210. Hence, when the retractor 200 is unlocked, the webbing 120 is unreeled in the direction of an arrow 252, and when the spindle 210 rotates, the resulting torque is input into the torsion bar 220 from the end portion of the first shaft part 220A. The torsion bar 220 is spun by the spindle 210, causing the tread head 230, into which torque is input from the torsion bar 220, to rotate.

(Male Screw Portion)

The retractor 200 includes a male screw portion 260 joined to the tread head 230. The male screw portion 260 projects from the tread head 230 into the interior of the spindle 210. The male screw portion 260 has a cylindrical shape such that the torsion bar 220 can be inserted into the interior thereof, and includes a first male screw groove 262 on its outer surface.

(Slide Nut and Slider)

Figure 3B:
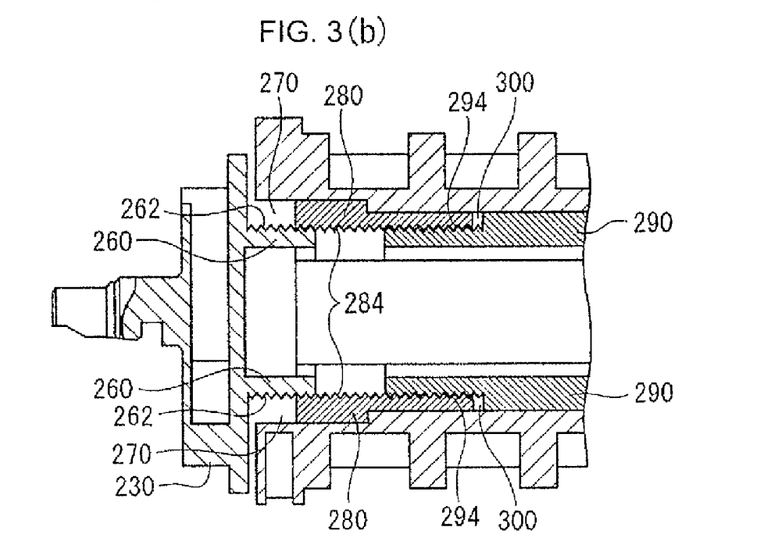

FIG. 3B is a partially enlarged view of FIG. 3A. The retractor 200 includes a slide nut 280 that is disposed in the interior of the spindle 210 at a gap 270 from the tread head 230. The slide nut 280 is capable of sliding but not capable of rotating relative to the spindle 210, and therefore rotates integrally with the spindle 210. As shown in FIG. 2, the slide nut 280 includes a through hole 282 into which the torsion bar 220 is inserted.

As shown in FIG. 3B, a female screw groove 284 that meshes with the first male screw groove 262 of the male screw portion 260 is formed on an inner surface of the slide nut 280. The slide nut 280 is not capable of rotating relative to the spindle 210 and is therefore spun by the spindle 210.

The retractor 200 further includes a slider 290 that is likewise disposed in the interior of the spindle 210, as shown in FIG. 3. As shown in FIG. 3A, the slider 290 is disposed in the spindle 210 to be capable of sliding but incapable of rotating relative to the intermediate portion 220C. The slider 290 is not joined to the spindle 210 in any way and is therefore capable of both sliding and rotating relative thereto. As shown in FIG. 2, the slider 290 includes a through hole 292 into which the torsion bar 220 is inserted. As shown in FIG. 3B, a second male screw groove 294 that meshes with the female screw groove 284 of the slide nut 280 while leaving play 300 is formed on an outer surface of the slider 290.

(Normal Operation)

Normally, when the webbing 120 is unreeled by the occupant, the spindle 210 rotates in a direction for unreeling the webbing 120 (the direction of the arrow 252). The torsion bar 220 and the tread head 230 joined thereto are spun by the spindle 210. The male screw portion 260, the slide nut 280, and the slider 290 are joined to the tread head 230, the spindle 210, and the intermediate portion 220C (the torsion bar 220), respectively, and are therefore also spun. Hence, during a normal operation, a relative positional relationship between the male screw portion 260, the slide nut 280, and the slider 290 does not vary.

(Load Limiter Mechanism)

Figure 4A:
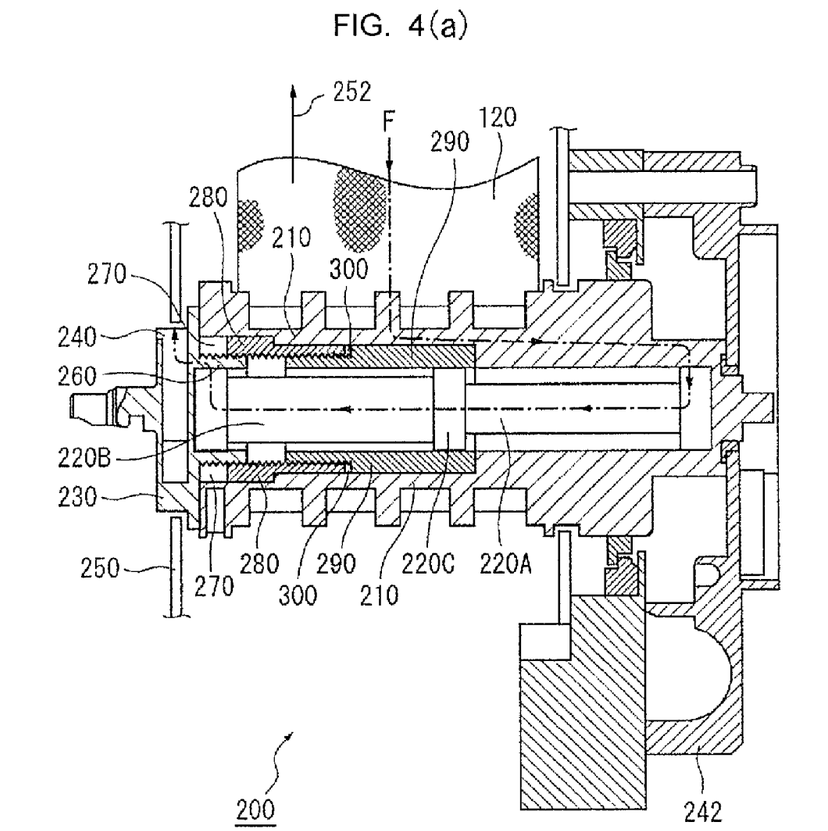
FIG. 4 is a view showing an example of a state of the retractor shown in FIG. 3 immediately after a first collision.
Figure 4B:
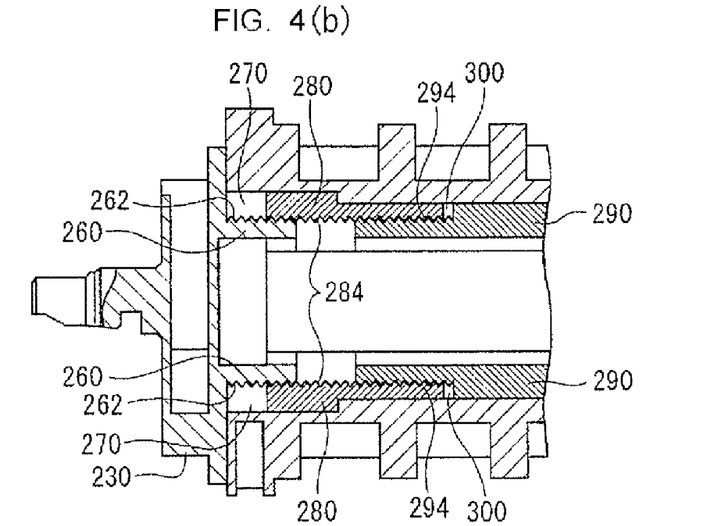

FIG. 4 is a view showing an example of a state of the retractor 200 shown in FIG. 3 immediately after a first collision. FIG. 4A is a view showing the entire retractor 200, and FIG. 4B is a partially enlarged view of FIG. 4A. A load limiter mechanism of the retractor 200 according to this embodiment will now be described. When the first collision occurs, the tread head 230 shown in FIG. 3 is fixed to the frame 250 (vehicle body) by the lock mechanism employing the lock dog 240 shown in FIG. 2, and as a result, the tread head 230 stops rotating. A pretension function is activated by the pinion 242 before the upper body of the occupant tilts forward, whereby the webbing 120 is retracted in the direction of an arrow 352 in order to eliminate looseness therein. An air bag, not shown in the drawing, is also activated.

When the upper body of the occupant tilts forward such that a load is exerted on the webbing 120 following activation of the pretensioner, the spindle 210 attempts to rotate in the direction for unreeling the webbing 120 (the direction of the arrow 252).

As shown in FIG. 4, torque F is transmitted to the torsion bar 220 via the end portion of the first shaft part 220A of the torsion bar 220, which is joined to the spindle 210. At this time, the torsion bar 220 is joined to the tread head 230 by the end portion of the second shaft part 220B, and therefore the torque F acts on the entire torsion bar 220, as shown by a dot-dash line arrow.

Figure 5:
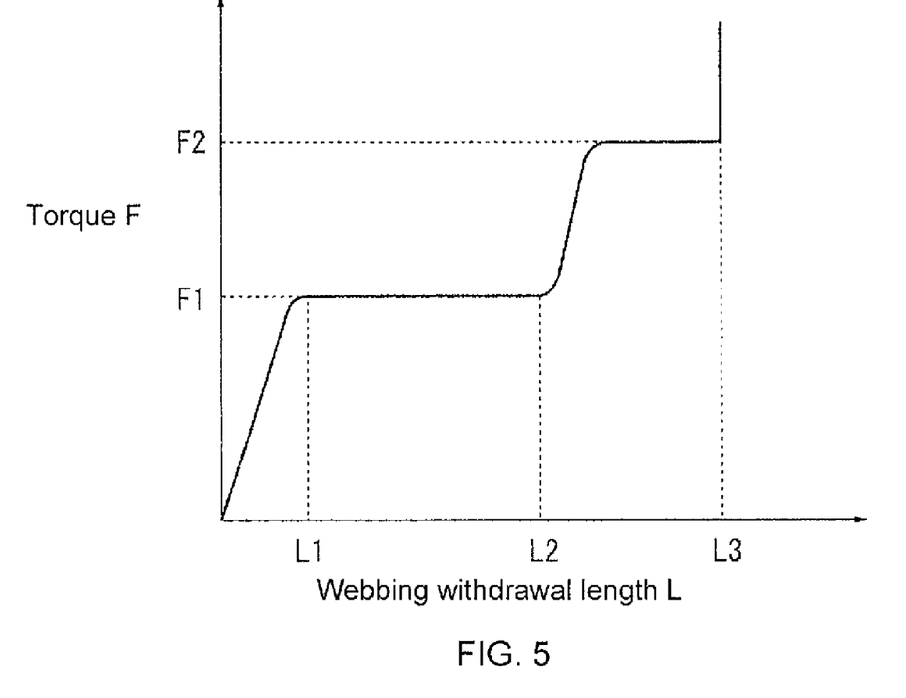
FIG. 5 is a graph showing in pattern form a relationship between a torque F acting on the retractor and an unreeled length L of a webbing in states shown in FIGS. 4, 7 and 8.

FIG. 5 is a graph showing, in a pattern form, a relationship between the torque F acting on the retractor 200 and an unreeled length of the webbing 120 in the state shown in FIG. 4 and the states shown in FIGS. 7 and 8, which are described below. When the torque F reaches a torsional rigidity F1 of the first shaft part 220A, only the first shaft part 220A twists. As a result, the webbing 120 is unreeled from an unreeled length L1 to an unreeled length L2. When the webbing 120 is unreeled, the load acting on the upper body of the occupant is lightened, and thus a load limitation operation of the first collision is performed.

The reason why only the first shaft part 220A twists is that the torsional rigidity F1 of the first shaft part 220A is smaller than a torsional rigidity F2 of the second shaft part 220B. In the state shown in FIG. 4, the torque F acts on the entire torsion bar 220, but at a stage where F=F1, the second shaft part 220B having the torsional rigidity F2 does not twist.

In FIG. 4, when the first shaft part 220A twists, the spindle 210 rotates in the direction for unreeling the webbing 120.

Accordingly, the slide nut 280 spins. At this time, the slide nut 280 is caused to slide toward the tread head 230 while rotating by the mesh between the first male screw groove 262 and the female screw groove 284. In this embodiment, the first male screw groove 262 and the female screw groove 284 are meshed in a right-hand screw direction.

The slider 290 is not spun by the spindle 210 as the slide nut 280 slides toward the tread head 230 while rotating in the manner described above. Hence, the slider 290 appears stationary and in absolute terms does not rotate. However, because the slider 290 is stationary, it rotates relative to the slide nut 280.

Therefore, the slider 290 is caused to slide toward the slide nut 280 by the mesh between the female screw groove 284 and the second male screw groove 294. The reason for this is that whereas the first male screw groove 262 and the female screw groove 284 are meshed in a right-hand screw direction, the female screw groove 284 and the second male screw groove 294 are meshed in an opposite left-hand screw direction.

Here, movement of the slide nut 280 and the slider 290 in a case where the spindle 210 rotates in the direction for unreeling the webbing 120 (the direction of the arrow 252) while the tread head 230 of the retractor 200 is locked (i.e. when the load limiter is activated) will be summarized. The slide nut 280 slides toward the tread head 230 (in a leftward direction of FIG. 3A) while rotating. The slider 290 slides toward the slide nut 280 (in the leftward direction of FIG. 3A). Hence, the slide nut 280 and the slider 290 move in an identical direction as if playing a game of chase, and in a direction for eliminating the gap 270 and the play 300, respectively.

(Gap/Play)

A feature of this embodiment is that during the chasing game described above, the play 300 is eliminated before the gap 270. In other words, the slider 290 catches up with the slide nut 280 before the slide nut 280 reaches the tread head 230.

As is evident from FIG. 4B, this feature is realized by making a length of the gap 270 greater than a length of the play 300. As long as the female screw groove 284 of the slide nut 280 has an even pitch, the gap 270 and the play 300 are eliminated at an equal speed, and therefore the shorter play 300 is eliminated first.

Figure 6:
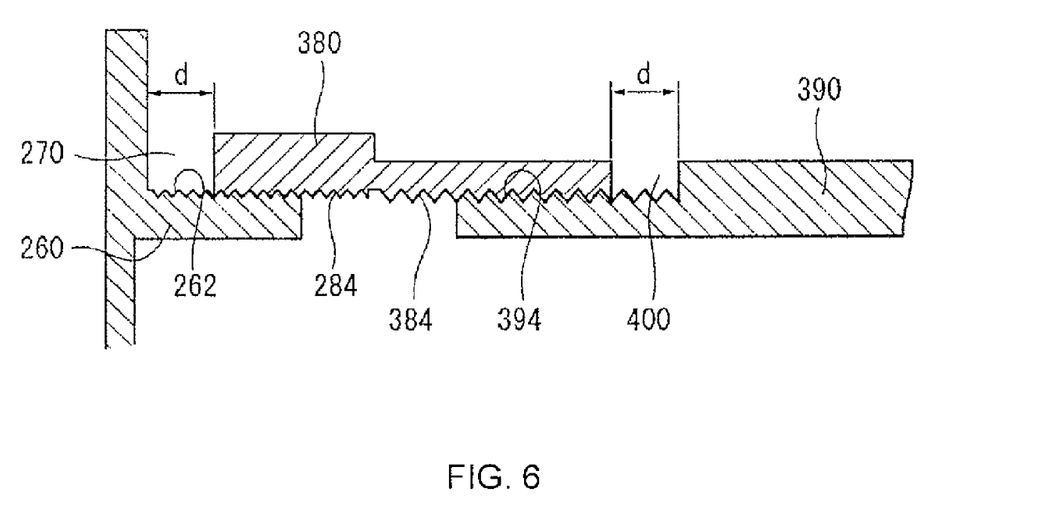
FIG. 6 is a view showing an example of a slide nut, a slider, and play that are modified from and can be substituted for respective elements shown in FIG. 3.

FIG. 6 is a view showing an example of a slide nut 380, a slider 390, and play 400 that are respectively modified from and can be substituted for the slide nut 280, the slider 290, and the play 300 shown in FIG. 4. In this modified example, the slide nut 380 includes the female screw groove 284 that meshes with the first male screw groove 262 of the male screw portion 260, and a female screw groove 384 that has a larger pitch than the female screw groove 284 and meshes with a second male screw groove 394 of the slider 390. The gap 270 and the play 400 have an equal length d, and therefore the play 400 formed between the female screw 384 and the second male screw groove 394 of the slider 390, which mesh at a larger pitch, is eliminated first.

Figure 7A:
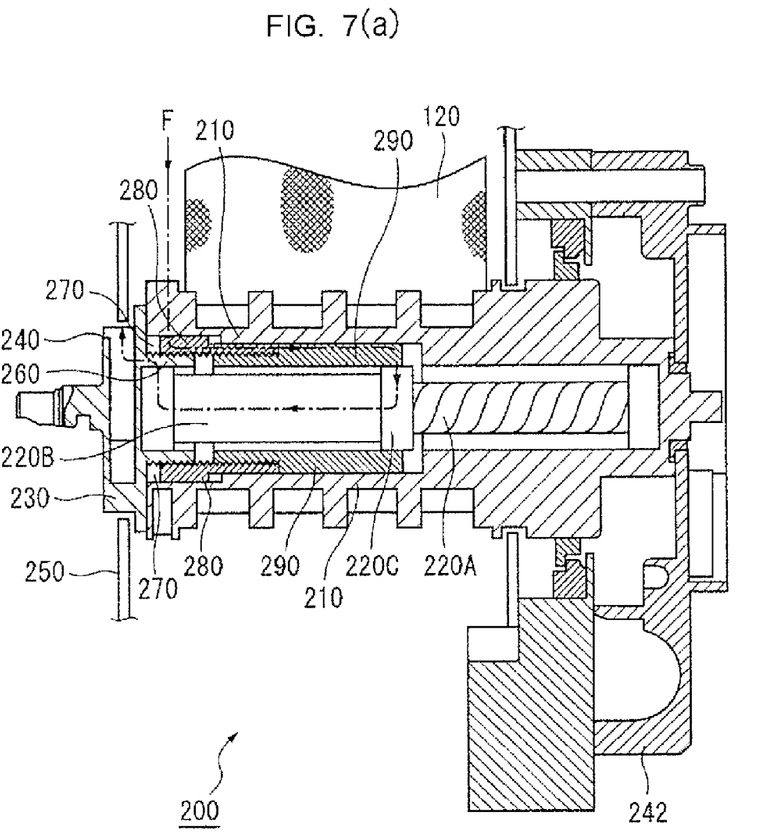
FIG. 7 is a view showing an example of a state immediately after a second collision, i.e. a stage subsequent to FIG. 4.
Figure 7B:
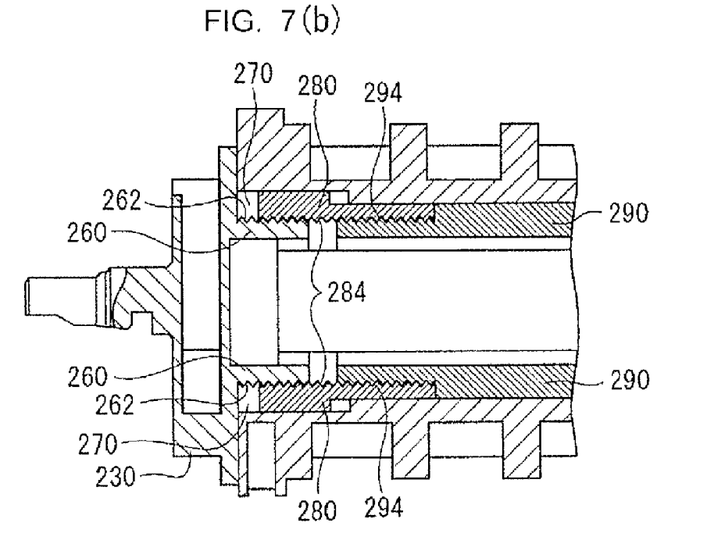

FIG. 7 is a view showing an example of a state immediately after a second collision, i.e. a subsequent stage to FIG. 4. In FIG. 7, the first shaft part 220A is already twisted due to the load limitation operation of the first collision, and therefore the play 300 has been eliminated such that the slide nut 280 and the slider 290 are integrated. Accordingly, the torque F input into the slide nut 280 from the spindle 210 is transmitted to the slider 290 integrated with the slide nut 280. The torque F is also input into the intermediate portion 220C. In other words, as shown by a dot-dash line arrow in FIG. 7, the torque F of the spindle 210 is input into only the second shaft part 220B of the torsion bar 220. The reason for this is that a phase shift does not occur between the first shaft part 220A that receives the torque F from the spindle 210 initially and the intermediate portion 220C that receives the torque F from the spindle 210 newly, and therefore the torque F does not act on the first shaft part 220A.

Note that the slide nut 280 and the slider 290 are not always integrated immediately after the second collision. However, as long as the torque F exceeds the torsional rigidity F1 of the first shaft part 220A during the second collision, the slide nut 280 and the slider 290 are integrated, and therefore the state shown in FIG. 7 is eventually established. If the torque F does not exceed the torsional rigidity F1 during the second collision, the load limiter is not activated, and therefore injury to an occupant caused by the load limiter operation does not have to be taken into consideration.

(Torsional Rigidity of Load Limiter)

According to the operation described above, the load limiter mechanism prepares the small torsional rigidity F1 for the first collision and the large torsional rigidity F2 for the second collision, as shown in FIG. 5. In other words, the load limiter mechanism withstands a larger unreeling force from the webbing 120 during the second collision than during the first collision. During the second collision, the load limiter mechanism is not activated unless a considerably large force for unreeling the webbing 120 is applied to the retractor 200, and accordingly, the webbing 120 is not unreeled.

In other words, in this embodiment, occupant restraint is prioritized over activation of the load limiter mechanism during the second collision. The reason for this is that during the second collision, the pretensioner and air bag activated during the first collision cannot be used. Hence, this embodiment achieves success in prioritizing the avoidance of serious injury to the occupant that may occur during the second collision due to non-activation of the air bag and so on over the avoidance of lighter injuries to the occupant caused by excessive restraining force from the webbing 120.

Further, according to this embodiment, the energy of an occupant having the build of a fifth percentile adult female can be absorbed in a low load region by the small torsional rigidity F1 prepared for the first half of the operation of the load limiter mechanism, while the energy of an occupant having the build of a fiftieth percentile adult male can be absorbed in a high load region by the large torsional rigidity F2 prepared for the latter half.

Since the larger torsional rigidity F2 is provided for the latter half, a movement amount of an occupant having the build of a fiftieth percentile adult male increases. However, a level of safety required to satisfy predetermined regulations can be secured in cooperation with the air bag.

When a large torsional rigidity is provided for the first half and a small torsional rigidity is provided for the latter half, the movement amount of an occupant having the build of a fiftieth percentile adult male can be reduced. However, the upper body of an occupant having the build of a fifth percentile adult female is substantially incapable of moving, and therefore the load limiter may not be activated, with the result that the occupant is restrained by excessive restraining force. It is therefore preferable to provide the small torsional rigidity F1 in the first half and the large torsional rigidity F2 in the latter half, as in this embodiment, so that occupant safety can be secured regardless of the build of the occupant.

According to this embodiment, in the case of an occupant having the build of a fiftieth percentile adult male, the large-diameter second shaft part 220B also twists during a frontal collision occurring at approximately 55 km/h. In the case of an occupant having the build of a fifth percentile adult female, on the other hand, only the small-diameter first shaft part 220A twists during a frontal collision occurring at approximately 55 km/h.

Furthermore, according to this embodiment, load switching is performed automatically when the small torsional rigidity F1 changes to the large torsional rigidity F2. Therefore, in contrast to a conventional adaptive load limiter, there is no need to detect the build of the occupant and switch the load in accordance therewith. Since an occupant detection sensor and a load switching mechanism are not required, a cost increase is avoided.

In many cases, the vehicle decelerates during the first collision such that a smaller impact is generated by the second collision. However, the impact generated by the second collision may be larger. As shown in FIG. 5, when the torque F applied from the spindle 210 reaches the torsional rigidity F2 of the second shaft part 220B during the second collision, the second shaft part 220B twists, and as a result, the webbing 120 is unreeled from the unreeled length L2 to an unreeled length L3. Since the webbing 120 is unreeled, the load exerted on the upper body of the occupant is lightened, and thus a load limitation operation of the second collision is performed.

(Stopper)

Figure 8A:
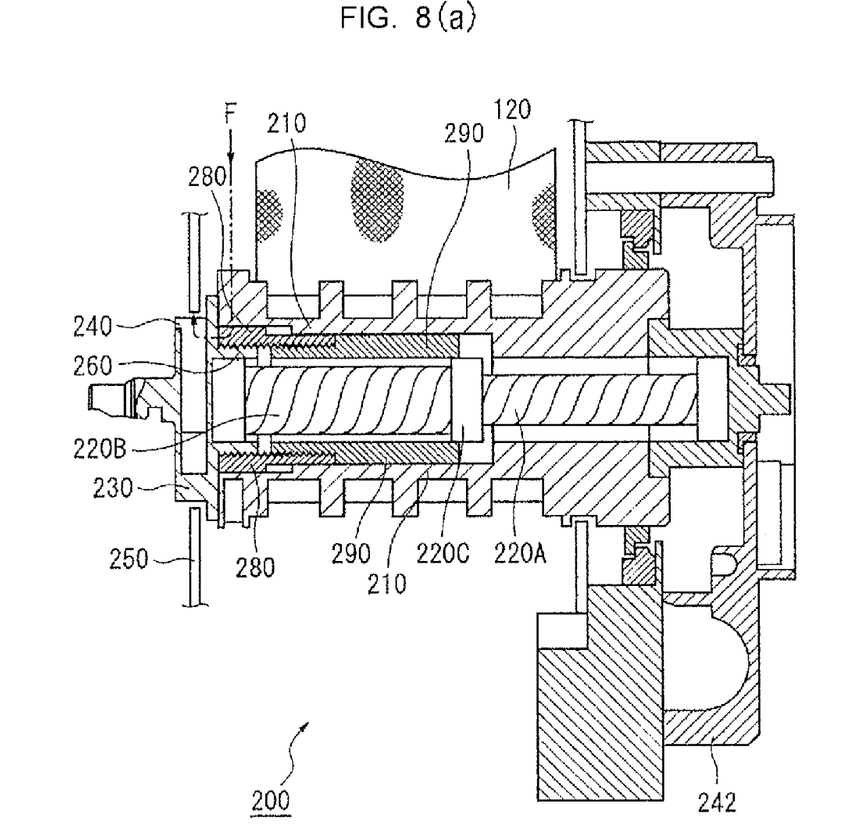
FIG. 8 is a view showing a state following a load limitation operation of the second collision, i.e. a stage subsequent to FIG. 7.
Figure 8B:
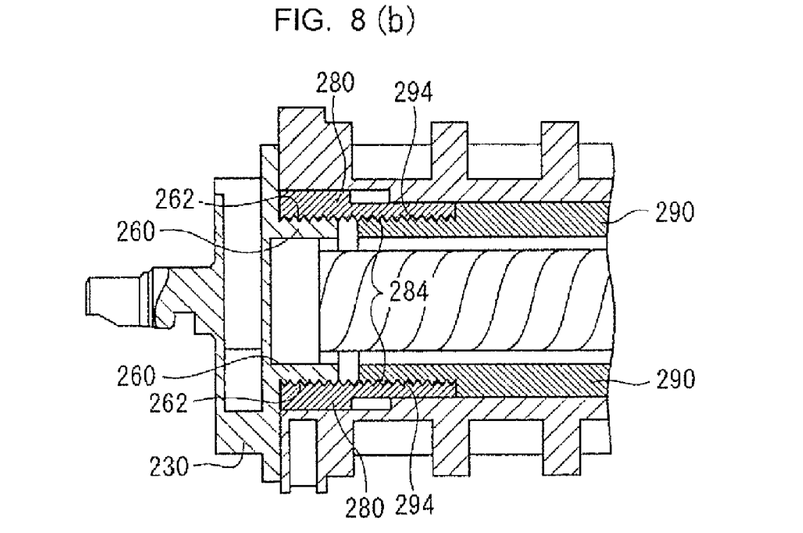

FIG. 8 is a view showing a state following the load limitation operation of the second collision, i.e. a subsequent stage to FIG. 7. When the webbing 120 is unreeled in the load limitation operation of the second collision, the second shaft part 220B twists such that the integrated slide nut 280 and slider 290 slide toward the tread head 230 while rotating. As a result, the gap 270 is eliminated, as shown in FIG. 8, and therefore the slide nut 280 and slider 290 are integrated with the tread head 230. These integrated components function as a stopper for preventing the spindle 210 from rotating any further in the direction for unreeling the webbing 120. Hence, unreeling of the webbing 120 is stopped promptly. As shown in FIG. 5 also, the stopper acts when the unreeled length L of the webbing 120 reaches the predetermined value L3 such that the unreeled length L of the webbing 120 does not increase thereafter regardless of subsequent increases in the torque F.

As described above, in this embodiment, the avoidance of serious injury to the occupant that may occur due to non-activation of the air bag and so on is prioritized by preparing the larger torsional rigidity F2 for the second collision. Even if the load limiter mechanism is activated regardless, the load limiter mechanism is forcibly stopped by the stopper described above, as shown in FIG. 8. Hence, in this embodiment, serious injury to the occupant that may occur during the second collision is avoided by twofold measures, namely the large torsional rigidity F2 and the stopper.

A preferred embodiment of the present invention was described above with reference to the attached drawings, but the embodiment described above is merely a preferred example of the present invention and other embodiments may be implemented or effected using various methods. Unless specific limiting description is provided in the specification of this application, the present invention is not limited to the shapes, sizes, constitutional arrangements and so on of the components illustrated in detail in the attached drawings. Further, expressions and terminology used in the specification of this application are provided for descriptive purposes, and unless specific limiting description is provided, the present invention is not limited to these expressions and terminology.

Accordingly, it is evident that a person skilled in the art would be able to arrive at various modified examples or amended examples within the scope of the claims, and it is to be understood that these modified examples and amended examples also belong to the technical scope of the present invention.

The present invention can be used as a seat belt retractor for retracting a seat belt of a vehicle.

What is claimed is:

1. A seat belt retractor comprising: a spindle for retracting a webbing; a torsion bar including a first shaft part and a second shaft part having a different torsional rigidity and an intermediate portion connecting the first and second shaft parts, the torsion bar being inserted into an interior of the spindle and joined to the spindle by an end portion of the first shaft part; a tread head joined to an end portion of the second shaft part of the torsion bar; a male screw portion that is joined to the tread head, the male screw portion having a cylindrical shape projecting into the interior of the spindle, wherein the male screw portion includes a first male screw groove on an outer surface thereof; a slide nut that is disposed in the interior of the spindle and spaced away from the tread head by a first distance, the tread head being configured to slide relative to the spindle but incapable of rotating relative to the spindle, the slide nut comprising a female screw groove formed on an inner surface thereof and configured to mesh with the first male screw groove of the male screw portion, wherein the slide nut moves toward the tread head while rotating by a mesh between the first male screw groove and the female screw groove, wherein the tread head is prevented from rotating by a predetermined lock mechanism and the spindle rotates in a direction for unreeling the webbing; and a slider that slides relative to the intermediate portion but that is incapable of rotating relative to the intermediate portion, the slider comprising a second male screw groove that meshes with the female screw groove of the slide nut, wherein the second male screw groove is spaced away from the female screw groove by a second distance, and wherein the slider slides toward the slide nut by a mesh between the female screw groove and the second male screw groove when the slide nut slides toward the tread head while rotating, wherein a torsional rigidity of the second shaft part is greater than a torsional rigidity of the first shaft part, and the second distance is eliminated before the first distance such that the slide nut and the slider are integrated.

2. The seat belt retractor according to claim 1, wherein, when the second distance is eliminated, the integrated slide nut and slider continue to slide until the first distance is eliminated, whereby the integrated slide nut and slider is integrated with the tread head.

3. The seat belt retractor according to claim 2, wherein a length of the first distance is greater than a length of the second distance.

4. The seat belt retractor according to claim 2, wherein the female screw groove has a larger pitch in a part that meshes with the second male screw groove of the slider than a pitch in a part that meshes with the first male screw groove of the male screw portion.

5. The seat belt retractor according to claim 1, wherein a length of the first distance is greater than a length of the second distance.

6. The seat belt retractor according to claim 1, wherein the female screw groove has a larger pitch in a part that meshes with the second male screw groove of the slider than a pitch in a part that meshes with the first male screw groove of the male screw portion.

* * * * *